Dec. 8, 1936.                I. J. RICHARDS                2,063,828
                         AGRICULTURAL APPARATUS
                         Filed Oct. 1, 1935        2 Sheets-Sheet 1
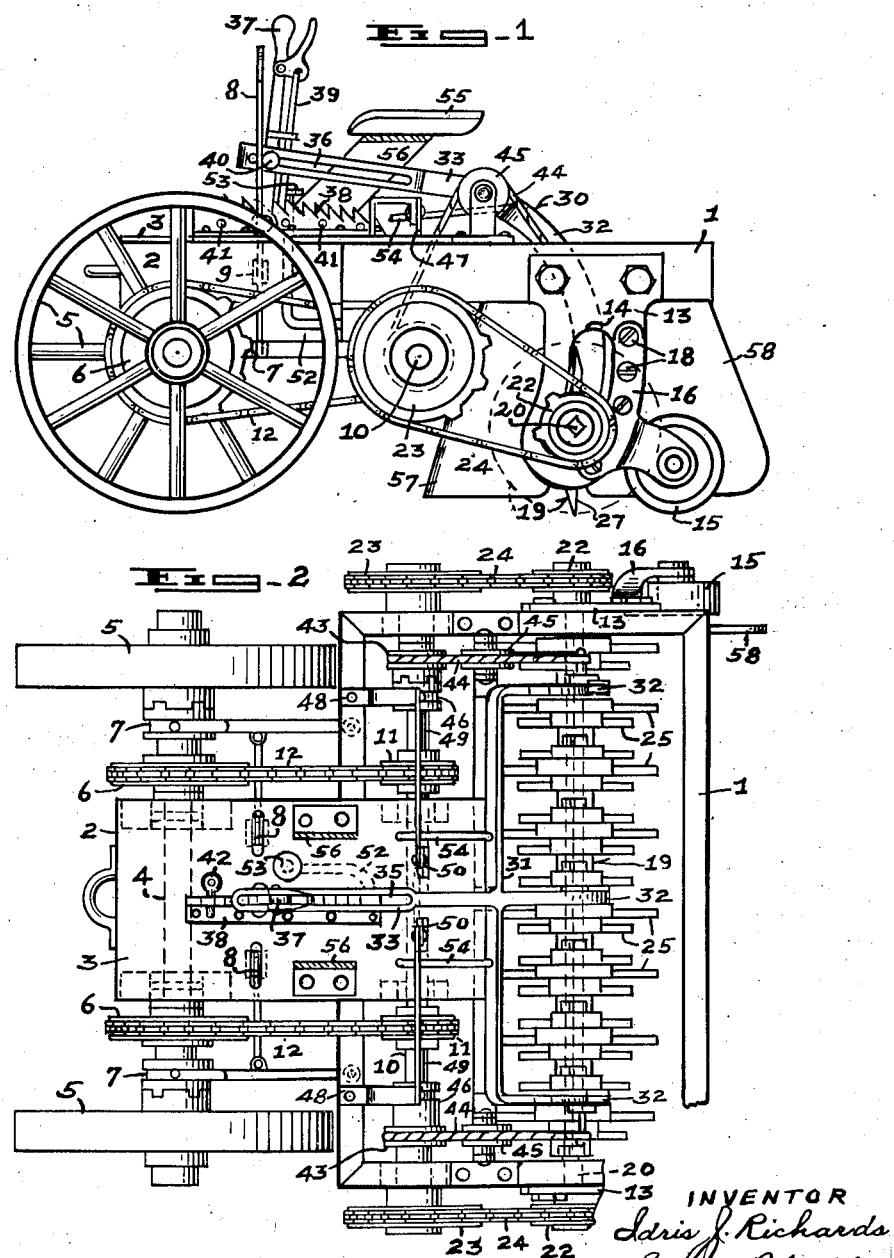

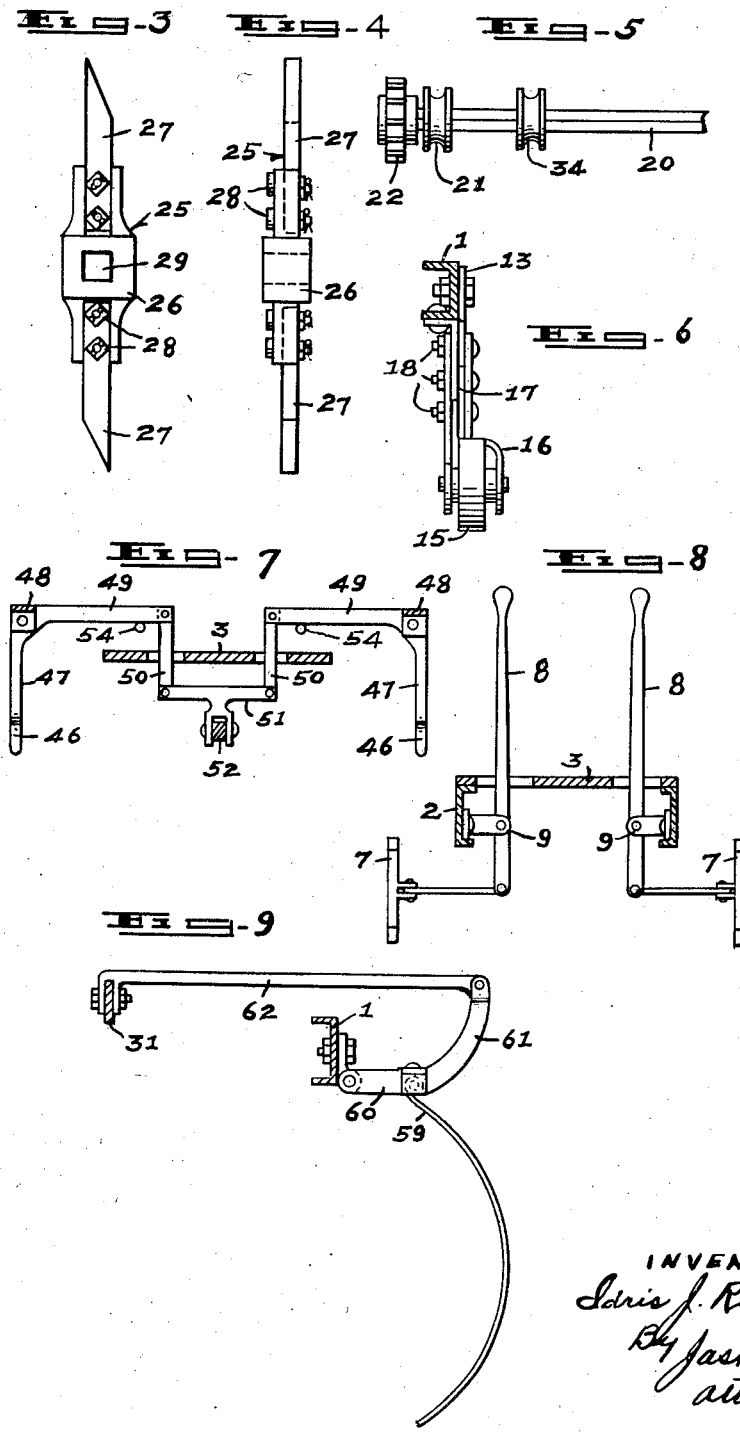

Patented Dec. 8, 1936

2,063,828

UNITED STATES PATENT OFFICE 2,063,828

AGRICULTURAL APPARATUS

Idris J. Richards, Pittsburgh, Pa.

Application October 1, 1935, Serial No. 43,041

2 Claims. (Cl. 97—40)

This invention relates to an agricultural apparatus, and while primarily intended for tilling the soil for agricultural purposes, it will be obvious that the device may be successfully employed for any other purposes wherein it is found to be applicable.

Important objects of the invention are to provide a machine of the character set forth, which will facilitate and expedite the tillage of soil for agricultural purposes, which eliminates the need for numerous farming implements now in common use, which is simple in its construction and arrangement, durable and highly efficient in its use, conveniently operable and controlled, and comparatively economical in its manufacture, operation, and maintenance.

With the foregoing and other objects in view which will appear as the description proceeds, the invention resides in the novel construction, combination, and arrangement of parts herein specifically described and illustrated in the accompanying drawings, but it is to be understood that the latter are merely illustrative of an embodiment of the invention, and that the actual needs of practice and manufacture may require certain mechanical variations from the embodiment shown. It is, therefore, not intended to limit the invention to the disclosure thereof illustrated, but rather to define such limitations to the scope of the claims hereunto appended.

In the drawings wherein like numerals of reference designate corresponding parts throughout the several views;

Figures 1 and 2 are, respectively, side elevational and top plan views of an agricultural apparatus constructed in accordance with the present invention.

Figures 3 and 4 are, respectively, side and edge views of the soil tilling elements.

Figure 5 is a fragmentary view of the rotor shaft with associated parts.

Figure 6 is a rear view of a trailer wheel and its connection with the apparatus.

Figures 7 and 8 are front views of the drive and hoisting clutches, embodied in the present invention.

Figure 9 is a side view of a hay rake with attachments for connecting the latter to the agricultural machine.

Referring in detail to the drawings, 1 denotes the entire frame, which is preferably constructed from structural steel and rigidly secured together in any suitable manner. The frame is substantially rectangular in contour, and includes a reduced or relatively narrow, centrally disposed, forward portion 2, which has a flat platform plate 3 fixed on the top thereof.

A transversely extending axle 4 is fixed against rotation, in any suitable manner, at the front and under side of the frame portion 2. A comparatively large traction wheel 5 is mounted on each end of the axle and is free to rotate of the latter. A sprocket wheel 6 is revolubly mounted on the axle between each of the traction wheels and the respective sides of the frame portion 2.

Each of the sprocket wheels 6 is provided with a clutch mechanism 7 operable to engage respective traction wheels 5, whereby the rotation of the latter will impart like rotation to the sprocket wheels 6. The clutch mechanisms 7 are operated to engage or release the traction wheels by a pair of laterally shiftable control levers 8, which are pivotally connected, as at 9, to the frame portion 2 and project vertically upward through openings in the platform plate 3 within convenient reach of the operator, as clearly indicated in Figure 8. The clutch mechanisms 7 are independently operable with respect to each other to facilitate the handling and turning of the apparatus in use.

A transversely extending drive shaft 10 is suitably journaled for rotation at the under side of the frame 1 and disposed parallel to the axle 4 rearwardly of but adjacent to the front frame portion.

The drive shaft 10 carries a pair of sprocket wheels 11, which are fixed on the former to turn therewith. A sprocket chain 12 is engaged on each of the sprocket wheels 11 and on respective sprocket wheels 6, whereby the rotation of the latter will impart like rotation to the drive shaft.

A pair of depending bearing brackets 13 is fixed to respective sides of the frame 1 adjacent to the rear of the latter. The bearing brackets are disposed parallel to each other, and each is provided with a comparatively large, arcuate-shaped bearing slot 14.

The rear of the apparatus is supported by a pair of comparatively small trailer wheels 15, which are suitably journaled for rotation in the attaching brackets 16. Each of the latter includes reenforcing, overlapping and interengaging filler members, as indicated at 17, and is secured to respective bearing brackets 13 by a plurality of bolts 18. The attaching brackets 16 virtually comprise the rear portions of the bearing brackets 13 and may be readily removed to provide access to the bearing slots 14 for the purpose to be described.

A transversely disposed soil tilling rotor 19 is mounted below and adjacent to the rear of the frame 1. The rotor includes a square shaft 20 provided with fixed bearing rollers 21, which are grooved and engaged in the bearing slots 14 of respective bearing brackets 13. The rotor is free to rotate and vertically shiftable or adjustable in the bearing slots 14.

Each end of the square rotor shaft 20 carries a fixed sprocket wheel 22, and each end of the drive shaft 10 carries a fixed sprocket wheel 23. Sprocket chains 24 engage respective sprocket wheels 22 and 23, whereby the rotation of the drive shaft 10 will impart like rotation to the rotor 19.

The rotor 19 comprises a plurality of soil breakers 25, each of which consists of a mounting block 26 and a pair of longitudinally aligned cutters 27. The latter are secured to the mounting blocks 26 by means of bolts 28, nuts and cotter pins. It is evident that the cutters 27 may be secured to the mounting blocks in any other suitable manner, for instance, by employing clamping plates bolted securely against the cutters and to the mounting blocks, allowing the ready removal of the cutters when repairs or replacements are required.

The mounting blocks 26 are provided with square-shaped openings 29 for the passage of the square rotor shaft 20 therethrough. The soil breakers 25 are positioned against each other on the rotor shaft 20, and are preferably uniform in construction, excepting that the positions of the openings 29 therein are varied to permit their arrangement, whereby adjacent soil breakers do not extend parallel to each other, but are disposed, preferably in the sequence of four, at diverse angles relatively to each other.

A carrier 30 is provided for supporting the rotor 19 when the latter is not in use and for controlling the operation of said rotor when in use. The carrier comprises a transversely extending cross-bar 31 provided with a plurality of arcuately curved, rearwardly depending legs 32 and with a centrally disposed arm 33, which projects forwardly above the platform plate 3.

The lower ends of the legs 32 are detachably joined, in any suitable manner, in grooved bearing rollers 34 fixed on the rotor shaft 20. It will here be noted that, by detaching the carrier legs 32 from the bearing rollers 34, by removing the sprocket chains 24 from the sprocket wheels 22, and by removing the attaching brackets 16 from the bearing brackets 13, the entire rotor 19 may be removed from the apparatus for any purposes required.

The carrier arm 33 inclines forwardly at a slight angle from the horizontal, and the forward portion thereof is formed with an elongated vertically disposed slot 35 and with an elongated horizontally disposed slot 36. A control lever 37, having its lower end pivotally connected to a ratchet plate 38 fixed on the platform plate 3, extends vertically through the vertical slot 35 in the carrier arm 33.

The control lever 37 includes a ratchet rod 39 engaging the ratchet plate 38 for securing the former against rearward movement on the latter, unless the ratchet rod 39 is manually released, from its engagement with the said ratchet plate, by the operator. A slide pin 40 is mounted in the control lever 37 and slidably engaged in the horizontal slot 36 in the carrier arm 33.

The control lever 37 normally remains at or adjacent to the forward end of the carrier arm 33, and the inclined position and the slots 35 and 36 thereof are simply provided to compensate for any slight variations in the relative positions of the control lever and carrier arm during the operation of the rotor 19.

When the control lever 37 is secured in its forward position by the engagement of the ratchet rod 39 in the forward end of the ratchet plate 38, the rotor 19 will be supported solely by the carrier 30 in its elevated, non-operative position, in the bearing slots 14. When the rotor 19 is lowered in the bearing slots 14, by the release of the control lever 37, it will be in the position to effect the soil tilling operation. If for any reason, as when passing over stones, roots, and the like, the rotor is shifted upwardly to a partially elevated position, the control lever will thereby be forcibly shifted forwardly and secured against rearward movement by the automatic engagement of the ratchet rod 39 in the ratchet plate 38, whereby the carrier 30 will continue to support the rotor in such partially elevated position, until the ratchet rod 39 is manually released from the ratchet plate 38 by the operator. This arrangement is a desirable feature of the invention, as it will obviously prevent potential damage to the tilling apparatus due to unfavorable soil conditions or the inadvertence of the operator. The ratchet plate 38 may be formed with spaced apertures 41 for the reception of a locking pin 42, which may be set either forwardly or rearwardly of the control lever 37 to limit the elevating movement of the rotor 19, or to limit the depth of the soil tilling operation, respectively.

The rotor 19 must necessarily be of considerable weight, and to facilitate its elevation to the non-operative position, a power-operated hoisting mechanism is provided. The latter comprises a pair of cable rollers 43, which are loosely mounted on the drive shaft 10 adjacent to respective ends of the latter. Cables 44, passing over sheaves 45 mounted on the top of the frame 1, are connected with each of the cable rollers 43 and with respective outer legs 32 of the carrier 30. Each of the cable rollers 43 is associated with an elevating clutch mechanism 46, which is mounted on the drive shaft 10 and operable for imparting rotation to the cable rollers to wind the cables on the latter and thereby effect the rotor elevating operation.

As clearly illustrated in Figure 7, the clutch mechanisms 46 are operated by L-shaped actuating elements 47, which are pivotally connected to suitable supporting brackets 48 fixed to the frame 1. The horizontally extending members 49, of the elements 47, are longitudinally aligned with each other and disposed above the platform plate 3. The adjacent ends of the horizontal members 49 are pivotally connected with links 50, which depend through openings in the platform plate and carry a pivotally joined connecting bar 51 at their lower ends below the platform plate. A pedal bar 52, having its rear end suitably pivoted to the frame 1, is pivotally connected to the bar 51 and projects forwardly and upwardly through an opening in the platform plate, and carries a pedal 53 at its free end disposed above the platform plate.

A pair of fixed, forwardly projecting clutch control fingers 54 are carried by the cross-bar 31 of the carrier 30, and the free end portions thereof extend under respective horizontal members 49 of the actuating elements 47. The purpose of the control fingers 54 is to automatically shift the actuating elements 47 to release the elevating clutch mechanisms 46 from the cable rollers 43 when the rotor has been elevated to the non-operative position.

To employ the power-operated hoisting mechanism, it is, of course, essential that the apparatus be travelling in the forward direction. When it is desired to elevate the rotor 19, the operator depresses the pedal 53 causing the clutch mechanisms 46 to engage respective cable rollers 43. The rotation of the latter will elevate the rotor together with the carrier 30. As said carrier 30 carries the control fingers 54, the latter on shifting upwardly during the rotor elevating operation will engage and shift the actuating elements 47 to release the clutch mechanisms 46 and thereby suspend the elevating operation. During the rotor elevating operation the control lever 37 will have been shifted forwardly, and the engagement of the ratchet rod 39 on the ratchet plate 38 will function to hold and support the rotor in the elevated position. To lower the rotor to the operative position it is only necessary to release the ratchet rod 39 from its engagement with the ratchet plate 38.

A suitable seat 55 for the operator, carried on a support 56, is mounted on the platform plate 3, and positioned to bring the control lever 37, the drive clutch levers 8, and the elevating clutch pedal 53, within convenient reach of the operator.

To protect the operating mechanism of the apparatus and for safety purposes, the soil tilling rotor 19 has its front and ends enclosed by suitable guards, respectively indicated at 57 and 58. The top and rear of the rotor may likewise be enclosed to provide additional factors of safety.

My improved apparatus is intended to be drawn by a team of horses or by a tractor, and is of such size as to best meet conditions found in practice. The rotating speed of the rotor 19 is, of course determined by the relative sizes of the sprocket wheels employed for transmitting the driving power from the traction wheels 5 to the rotor. If necessary, the traction wheels may be provided with traction cleats to afford greater tractive force.

The apparatus is particularly adapted for tilling soil on land areas covered with grain or corn stubbles, and obviates the necessity of plowing such areas with the usual plow implements in the ordinary slow method. The rotor may be constructed and adjusted to operate in the soil at any reasonable depth, and by its operation the soil will be thoroughly worked, finely granulated, evenly and flatly distributed, and not infrequently completely prepared ready for seeding without necessitating the usual harrowing operations.

It will here be noted that the apparatus may be readily employed for tedding hay, by removing the soil tilling rotor 19 and substituting therefor a hay tedder provided with suitable elements to adapt same for connection and operation in the apparatus. In like manner, a disk harrow or any other revoluble agricultural or harvesting device may be successfully embodied in the apparatus.

By removing the rotor 19 from the apparatus, the latter may be employed in connection with various types of harrows, corn cultivators and shovel plows, potato diggers, ditch diggers, seeders, rollers, or any other agricultural or harvesting implements capable of being constructed to render same adaptable for operation in connection with an apparatus of the character set forth. In Figure 9, a hay rake 59 is adapted for connection with the apparatus. Owing to the comparative lightness of the work, the rake may be constructed of a width very much greater than the width of the frame 1. The rake is hingedly connected, as at 60 to the rear of the frame 1, and provided with elevating arms 61, which are pivotally joined with connecting bars 62 connected to the cross-bars 31 of the carrier 30, whereby the power-operated hoisting mechanism may be employed for effecting the rake dumping operations.

The present invention provides a most efficient device of its kind, which is conveniently operable for facilitating and expediting agricultural and harvesting operations, and which will eliminate the need of the many separate farming implements now in common use.

What I claim is:

1. An agricultural apparatus comprising a frame, a transversely extending axle fixed at the front of said frame, a pair of comparative large traction wheels revolubly mounted at respective ends of said axle, a pair of relatively small wheels supporting the rear of said frame, a soil tilling rotor revolubly mounted at the rear of said frame and including a plurality of separate soil breakers having detachable soil cutters, an independently controlled drive mechanism connected with each of said large traction wheels for rotating said rotor, power-operated means for elevating said rotor to the non-operative position in said frame, automatically operated means for suspending the rotor elevating operation, and means for automatically securing said rotor in the elevated position.

2. An agricultural apparatus comprising a frame, a transversely extending axle fixed in said frame, a pair of traction wheels revolubly mounted at respective ends of said axle and supporting one end of said frame, a pair of supporting wheels supporting the other end of said frame, a soil tilling rotor revolubly mounted at the rear of said frame and including a plurality of separate soil breakers having detachable soil cutters, an independently controlled drive mechanism connected with each of said pair of traction wheels for rotating said rotor, power-operated means for elevating said rotor to the non-operative position in said frame, automatically operated means for suspending the rotor elevating operation, and means for automatically securing said rotor in the elevated position.

IDRIS J. RICHARDS.